United States Patent Office 3,281,422
Patented Oct. 25, 1966

3,281,422
SULFUR-CONTAINING NAPHTHOQUINONES
Walter Gauss, Cologne - Stammheim, Karl - Wolfgang Schellhammer, Leverkusen, and Maria Brommelhues, Wuppertal-Sonnborn, Germany, assignors to Farbenfabriken Bayer Aktiengesellschaft, Leverkusen, Germany, a corporation of Germany
No Drawing. Filed Jan. 15, 1964, Ser. No. 337,731
6 Claims. (Cl. 260—268)

The present invention relates to novel chemical compounds useful for inhibiting or retarding growth or multiplication of microorganisms including bacteria and more particularly to sulfur-containing naphthoquinones which are the reaction products of haloalkylated naphthoquinones and mercapto or mercapto-like compounds. This application is a continuation-in-part of United States Serial No. 188,248, filed April 17, 1962, now abandoned.

The compounds of the invention have the formula:

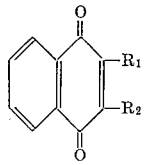

in which $R_1$ is selected from the group consisting of

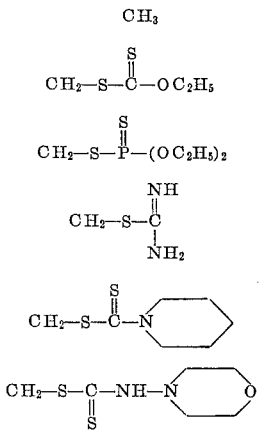

and

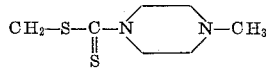

and $R_2$ is selected from the group consisting of

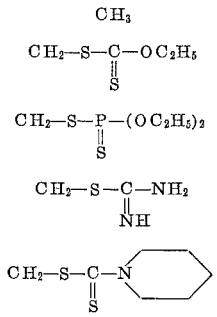

and

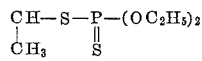

$R_1$ and $R_2$ never both being $CH_3$.

The reaction between the haloalkylated naphthoquinone and the mercapto or mercapto-like compound takes place at room temperature but can be carried out partially or entirely at temperatures somewhat above or somewhat below room temperature depending upon the particular reactants employed. The reaction may also be carried out in the presence of a solvent or diluent and for that purpose lower aliphatic alcohols such as methanol and ethanol have been found to be very suitable but other inert solvents can also be employed. The reactions give excellent yields and the reaction products are, for the most part, crystalline compounds which either as such or in the form of the usual pharmaceutically acceptable non-toxic salts such as the hydrochloride have effective action in checking or stopping the growth of microorganisms.

Among the haloalkylated naphthoquinones which can be used are 2-methyl-3-chloromethyl-1,4-naphthoquinone, 2,3-bis-chloromethyl-1,4-naphthoquinone and 2 - methyl-3-(α-bromoethyl) - 1,4 - naphthoquinone. The haloalkylated naphthoquinone is reacted either as such or in the form of its alkali metal salt, e.g. the sodium or potassium salt with, for instance, potassium xanthate, potassium O,O-diethyl thiono thiolphosphate, thiourea, potassium N,N-pentamethylene dithiocarbamate with piperidine and carbon disulfide, sodium N,N-pentamethylene dithiocarbamate with piperidine and carbon disulfide, O,O-diethyl thiono thiol-phosphoric acid potassium salt, N-aminomorpholine and carbon disulfide or N-methylpiperazine and carbon disulfide. In general the haloalkylated naphthoquinone is reacted with the mercapto or mercapto-like compound in such proportions that for each haloalkyl group there is preferably used one mole of an alkali metal or ammonium salt of the mercapto or mercapto-like compound which may, however, be present in slight excess.

The novel compounds of the present invention as set forth in the following examples represent an outstanding group of compounds with excellent antimicrobial activity. The new compounds may be administered or applied in any suitable dosage form in conjunction with any of the usual vehicles or carriers.

*Example 1*

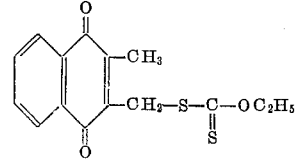

To a suspension of 55 g. (0.25 mole) of 2-methyl-3-chloromethyl-1,4-naphthoquinone in 500 ml. of alcohol there is added dropwise with stirring a solution of 48 g. (0.30 mole) of potassium xanthate in 1.25 liters of alcohol. The yellow reaction product precipitates in the course of the reaction. After stirring for a further 15 minutes the product is filtered off with suction at 0° C., washed successively with alcohol, water and alcohol and dried. The product (69.9 g. of M.P. 96–97° C.) can be obtained analytically pure by recrystallizing from ten times its quantity of alcohol and then melts at 98–99° C.

*Example 2*

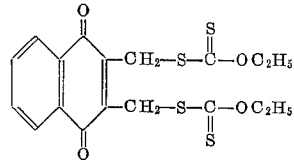

To a suspension consisting of 12.8 g. of 2,3-bis-chloromethyl-1,4-naphthoquinone and 100 ml. of alcohol there is added dropwise with stirring a solution of 19.2 g. (0.12 mole) of potassium xanthate in 500 ml. of alcohol. On the following day the precipitated yellow product is filtered off with suction, washed successively with alcohol, water and alcohol and allowed to dry. The product (15.3 g. of M.P. 109–111° C.) is obtained analytically pure by recrystallizing once from thirty times its quantity of alcohol and then melts at 113–114° C.

*Example 3*

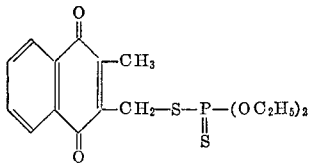

To a mixture of 22.0 g. (0.1 mole) of 2-methyl-3-chloromethyl-1,4-naphthoquinone and 150 ml. of alcohol there is added dropwise with stirring a solution of 22.4 g. (0.1 mole) of potassium O,O-diethyl-thiono-thiolphosphate in 150 ml. of alcohol. On the following day the precipitated potassium chloride is filtered off with suction and the filtrate is concentrated in a vacuum. The solid yellow residue is washed with water and subsequently with a little alcohol and after drying (32.5 g. of M.P. 69.5–71.5° C.) recrystallized from five times its quantity of alcohol (cooling to −20° C.). The product is then analytically pure and melts at 71–72° C.

*Example 4*

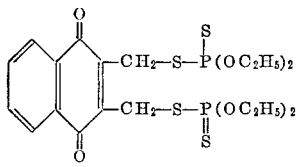

To a mixture consisting of 12.8 g. (0.05 mole) of 2,3-bis-chloromethyl-1,4-naphthoquinone and 100 ml. of alcohol there is added dropwise a solution of 24.6 g. (0.11 mole) of potassium O,O-diethyl thiono-thiolphosphate in 150 ml. of alcohol. The yellow product of the reaction is filtered off with suction after a few hours at 0° C. and washed successively with alcohol, water and again alcohol. The product melts at 87–88° C. The melting point does not change upon recrystallization from ten times its quantity of alcohol.

*Example 5*

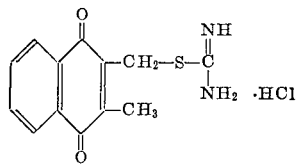

15.2 g. (0.2 mole) of thiourea are warmed in 300 ml. of alcohol until dissolved and 44.0 g. (0.2 mole) of 2-methyl - 3 - chloromethyl-1,4-naphthoquinone are then added and the mixture boiled up once more. The reaction product as formulated in the heading is precipitated, the mixture is allowed to cool by itself and the precipitate is filtered off with suction at 0° C. and washed with cold ethanol. The melting point of the dry compound (47.5 g.) lies at 193–195° C. (decomposition) after dipping at 180° C. It does not change upon recrystallization from fifteen times its quantity of methanol.

*Example 6*

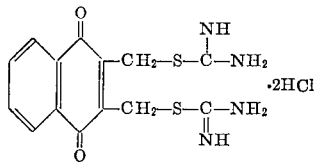

A solution of 51 g. (0.2 mole) of 2,3-bis-chloromethyl-1,4-naphthoquinone in 2 liters of hot alcohol are treated with a solution of 33.5 g. (0.44 mole) of thiourea in 1 liter of alcohol. The product as formulated in the heading gradually precipitates. It is filtered off with suction after a few days, washed with alcohol and dried. The yield amounts to 50 g.

*Example 7*

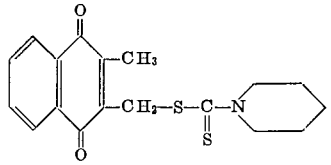

To a suspension consisting of 22.0 g. (0.1 mole) of 2-methyl-3-chloromethyl-1,4-naphthoquinone and 300 ml. of methanol there is added dropwise with stirring a solution of potassium N,N-pentamethylene-dithiocarbamate, prepared from 0.1 mole of sodium methylate (in 46 ml. of methanolic solution), 9.9 ml. (0.1 mole) of piperidine and 6.7 ml. (0.11 mole) of carbon disulfide. The precipitated product, as formulated in the heading, is filtered off with suction after some time, washed with methanol, water and again with methanol. The dry product (30.5 g. of decomposition point 139–140° C.) is obtained analytically pure by reprecipitating once from chloroform-methanol; decomposition point 143° C.

*Example 8*

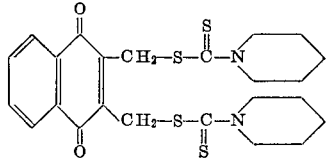

35.5 g. (0.1 mole) of 2,3-bis-chloromethyl-1,4-naphthoquinone in 200 ml. of methanol are reacted with stirring with sodium N,N-pentamethylene-dithiocarbamate, prepared from 0.2 mole of sodium methylate (in 92 ml. of methanolic solution), 19.8 ml. (0.2 mole) of piperidine and 13.4 ml. (0.22 mole) of carbon disulfide. After some time the precipitated compound, as formulated in the heading, is filtered off with suction and washed with methanol, water and again with methanol. The air-dried yellow product (46.2 g. of decomposition point 125.5–126.5° C.) is obtained analytically pure by reprecipitating once from chloroform - ethanol; decomposition point 129.5° C.

*Example 9*

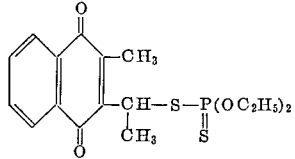

55.8 grams (0.2 mole) of 2-methyl-3-(α-bromoethyl)-1,4-naphthoquinone, 600 milliliters of alcohol and 53.7 grams (0.24 mole) of O,O-diethyl-thionothiol phosphoric acid potassium salt were stirred together for four days. This is suction filtered at 0° C., washed with chilled alcohol, water and again with alcohol. The dried crude product (61 grams of M.P. 73–76° C.) was purified by recrystallization from a little alcohol. The compound then melts at 76.5–77° C.

Example 10

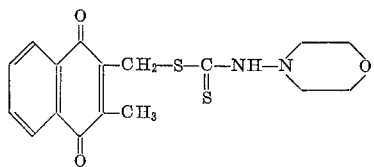

To 11.2 grams of N-amino-morpholine in 100 milliliters of alcohol there is added dropwise under ice cooling and stirring 7.2 milliliters of carbon disulfide and then at 20–25° C. within six minutes 11 grams of 2-methyl-3-chloromethyl-1,4-naphthoquinone. The next day the compound of the heading formula is isolated at 0° C., washed with chilled alcohol and dried. The crude product (20.6 grams) is completely purified by twice recrystallizing it from methylethylketone. The decomposition point lies at 180.5–181° C.

Example 11

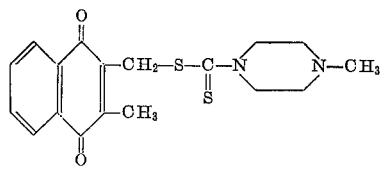

To a mixture of 33.0 grams (0.33 mole) of N-methyl-piperazine and 300 milliliters of alcohol, there is added dropwise under ice cooling and stirring within thirty minutes 21.6 milliliters of carbon disulfide. Then this is mixed with an additional 500 milliliters of alcohol and there is gradually introduced under further ice cooling 66.0 grams (0.3 mole) of 2-methyl-3-chloromethyl-1,4-naphthoquinone. The yellow suspension is then stirred at room temperature for six days, suction filtered at 0° C. and washed with a little cool alcohol. The filter cake is mixed with 4 liters of water and treated portionwise with 42 grams of sodium bicarbonate. The next day the crude product of the heading formula is suction filtered, washed with water, dried (62.5 grams) and purified by dissolving and reprecipitating from benzol-ether. Melting point 118–119° C.

What is claimed is:

1. A compound of the formula:

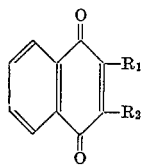

in which $R_1$ is selected from the group consisting of

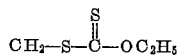
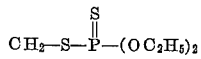
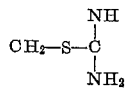
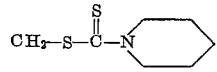
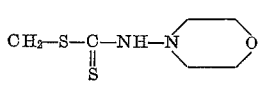

and

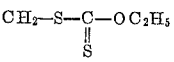

and $R_2$ is selected from the group consisting of

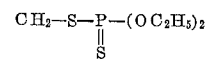
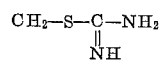
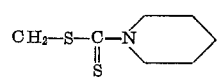
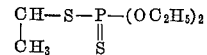

and

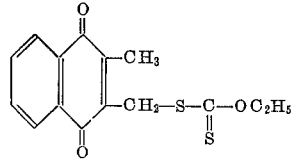

$R_1$ and $R_2$ never both being $CH_3$.

2. The compound

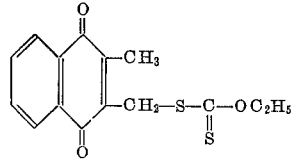

3. The compound

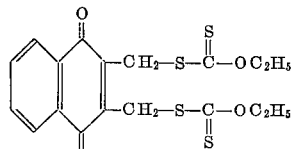

4. The compound

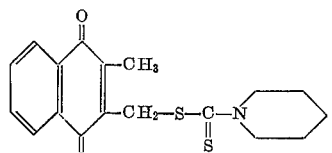

5. The compound

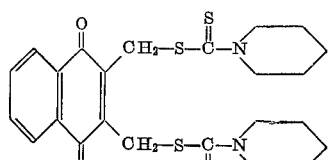

6. The compound

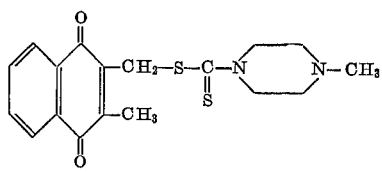

No references cited.

ALEX MAZEL, *Primary Examiner.*

NICHOLAS S. RIZZO, HENRY R. JILES, *Examiners.*

JOSE TOVAR, *Assistant Examiner.*